（12） United States Patent
Sasaki et al.

(10) Patent No.: US 8,131,893 B2
(45) Date of Patent: Mar. 6, 2012

(54) MEMORY DEVICE THAT MEDIATES MUTUAL COMMUNICATION AMONG A PLURALIITY OF CPUS

(75) Inventors: Gen Sasaki, Osaka (JP); Masahiro Moriyama, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 505 days.

(21) Appl. No.: 11/780,057

(22) Filed: Jul. 19, 2007

(65) Prior Publication Data

US 2008/0046605 A1 Feb. 21, 2008

(30) Foreign Application Priority Data

Aug. 21, 2006 (JP) ................................. 2006-223847

(51) Int. Cl.
*G06F 3/00* (2006.01)
*H03K 19/00* (2006.01)

(52) U.S. Cl. ........................................... 710/52; 326/56

(58) Field of Classification Search ...................... 710/52
See application file for complete search history.

(56) References Cited

U.S. PATENT DOCUMENTS

| 4,884,192 A | * | 11/1989 | Terada et al. ................. 709/251 |
| 6,456,628 B1 | * | 9/2002 | Greim et al. .................. 370/466 |
| 7,228,375 B1 | * | 6/2007 | Jacobson ...................... 710/317 |

FOREIGN PATENT DOCUMENTS

| JP | 10-171750 | 6/1998 |
| JP | 2000-347927 | 12/2000 |
| JP | 2001-157049 | 6/2001 |
| JP | 2001-166960 | 6/2001 |

* cited by examiner

*Primary Examiner* — Henry Tsai
*Assistant Examiner* — Juanito Borromeo
(74) *Attorney, Agent, or Firm* — Oblon, Spivak, McClelland, Maier & Neustadt, L.L.P.

(57) ABSTRACT

In a memory device, data can be transmitted from a first CPU to a second CPU via an individual register or a shared SRAM, for example. The data transmitted from the first CPU to the second CPU via the individual register also passes through a FIFO. When first data is transmitted via the shared SRAM and then second data is transmitted via the individual register, for example, and if the first data transmission is adjusted by a SRAM controller and put into a waiting state at the FIFO, the second data transmitted via the individual register also passes through the FIFO, preventing the second data transmission from being completed earlier than the first data transmission. The data transmissions can therefore be completed appropriately. This in turn increases reliability of the memory device.

15 Claims, 9 Drawing Sheets

MEMORY DEVICE THAT MEDIATES MUTUAL COMMUNICATION AMONG A PLURALIITY OF CPUS

BACKGROUND OF THE INVENTION

1. Field of the Invention

The present invention relates to memory devices, and more specifically to a shared memory device that mediates mutual communication among a plurality of CPUs.

2. Description of the Background Art

Japanese Patent Application Laid-Open No. 2001-166960 discloses a multiprocessor system in which an individual memory of each processor module in the multiprocessor system is allocated as an individual area in a shared memory that is shared by the processor modules.

Techniques pertinent to the present invention are also disclosed in Japanese Patent Application Laid-Open Nos. 2000-347927, 10-171750 (1998), and 2001-157049.

In some network, a plurality of PCs communicate via a shared memory. However, response speed required is slow with network communication among PCs compared to communication among CPUs in a device. This means that problems can occur when a shared memory in network communication is used for communication among PCs.

In addition, it has been desired to increase reliability of a memory device used for mutual communication among a plurality of CPUs via a memory shared by the plurality of CPUs and an individual memory provided with each of the CPUs.

SUMMARY OF THE INVENTION

In a first aspect of the present invention, a memory device accessible by a first CPU and a second CPU includes: a first FIFO provided in a corresponding manner to the first CPU; a second FIFO provided in a corresponding manner to the second CPU; a shared storage medium configured to be writable and readable by the first CPU and the second CPU via the first FIFO and the second FIFO, respectively; a first individual storage medium provided in a corresponding manner to the first CPU, the first individual storage medium being configured to be writable exclusively by the first CPU via the first FIFO, and readable independently by the first CPU and the second CPU via the first FIFO and the second FIFO, respectively; and a second individual storage medium provided in a corresponding manner to the second CPU, the second individual storage medium being configured to be writable exclusively by the second CPU via the second FIFO, and readable independently by the first CPU and the second CPU via the first FIFO and the second FIFO, respectively.

Both of first data transmitted via the first individual storage medium and second data transmitted via the shared storage medium pass through the first FIFO and the second FIFO. Accordingly, when the second data is transmitted and then the first data is transmitted, and if the second data transmission is adjusted and put into a waiting state at the first FIFO or the second FIFO, the first data transmission will not be completed earlier than the second data transmission. The order of a series of data transmissions is thus not changed, thus avoiding a malfunction in the transmissions. In this regard, communication between the first CPU and the second CPU is ensured by hardware, thereby increasing reliability of the memory device.

In a second aspect of the present invention, in the memory device according to the first aspect, data corresponding to different addresses of the first individual storage medium are simultaneously readable by the first CPU and the second CPU.

The first CPU can always read data from the first individual storage medium regardless of access operation to the first individual storage medium by the second CPU. This allows data to be transmitted between the first CPU and the second CPU at high response speed.

In a third aspect of the present invention, in the memory device according to the first or second aspect, the shared storage medium includes an area writable exclusively by the first CPU, the first individual storage medium is written with information indicating the area by the first CPU, and the memory device further includes a shared storage medium controller configured to prohibit writing from the first CPU to the shared storage medium, except for the area.

Data written by the second CPU in an area other than the area writable exclusively by the first CPU cannot be changed or erased by the first CPU. The data is thus protected.

In a fourth aspect of the present invention, in the memory device according to the first or second aspect, the shared storage medium includes an area writable exclusively by the second CPU, the first individual storage medium is written with information indicating the area by the first CPU, and the memory device further includes a shared storage medium controller configured to prohibit writing from the second CPU to the shared storage medium, except for the area.

Data written by the first CPU in an area other than the area writable exclusively by the second CPU cannot be changed or erased by the second CPU. The data is thus protected.

In fifth aspect of the present invention, the memory device according to the first or second aspect further includes: a first parallel I/F and a first serial I/F provided in a corresponding manner to the first CPU, the first parallel I/F and the first serial I/F being capable of communicating with the first CPU; a second parallel I/F and a second serial I/F provided in a corresponding manner to the second CPU, the second parallel I/F and the second serial I/F being capable of communicating with the second CPU; a first selection section provided in a corresponding manner to the first CPU, the first selection section being configured to connect selectively the first parallel I/F and the first serial I/F to the first FIFO; and a second selection section provided in a corresponding manner to the second CPU, the second selection section being configured to connect selectively the second parallel I/F and the second serial I/F to the second FIFO.

The memory device is capable of both serial transmission and parallel transmission.

In a sixth aspect of the present invention, in the memory device according to the fifth aspect, the first selection section is based on a selection signal defined by an external signal, and the second selection section is based on a signal stored in the first individual storage medium.

The first CPU can change the transmission mode of the second CPU. The transmission mode of the second CPU can be changed by software.

In a seventh aspect of the present invention, in the memory device according to the first or second aspect, the first individual storage medium is written with an interrupt request from the first CPU to the second CPU, and the memory device further includes an interrupt processing section configured to output an interrupt signal to the second CPU with the interrupt request as a trigger.

The interrupt request from the first CPU to the second CPU is written in the first individual storage medium corresponding to the first CPU. Accordingly, the first CPU can independently interrupt the second CPU.

In an eighth aspect of the present invention, in the memory device according to the seventh aspect, the interrupt processing section outputs the interrupt signal to the second CPU with one of a level or an edge of the interrupt request selectively as a trigger.

The interrupt signal can be output with one of the level and edge of the interrupt request selectively as a trigger.

In a ninth aspect of the present invention, in the memory device according to the first or second aspect, first individual storage medium is written with depth information on the first FIFO, and the memory device further includes a FIFO depth changing section configured to change a depth of the first FIFO based on the depth information.

The depth of a FIFO corresponding to a CPU having large capacity of data transmission can be set deeper, and the depth of a FIFO corresponding to a CPU having small capacity of data transmission can be set shallow. This allows data transmission of large capacity to be conducted by priority.

These and other objects, features, aspects and advantages of the present invention will become more apparent from the following detailed description of the present invention when taken in conjunction with the accompanying drawings.

DESCRIPTION OF THE PREFERRED EMBODIMENTS

Preferred embodiments of the present invention will be described with reference to the drawings. Like reference numerals refer to like or corresponding parts in the drawings, and descriptions of the like or corresponding parts will not be replicated below.

First Preferred Embodiment

Figure 1:
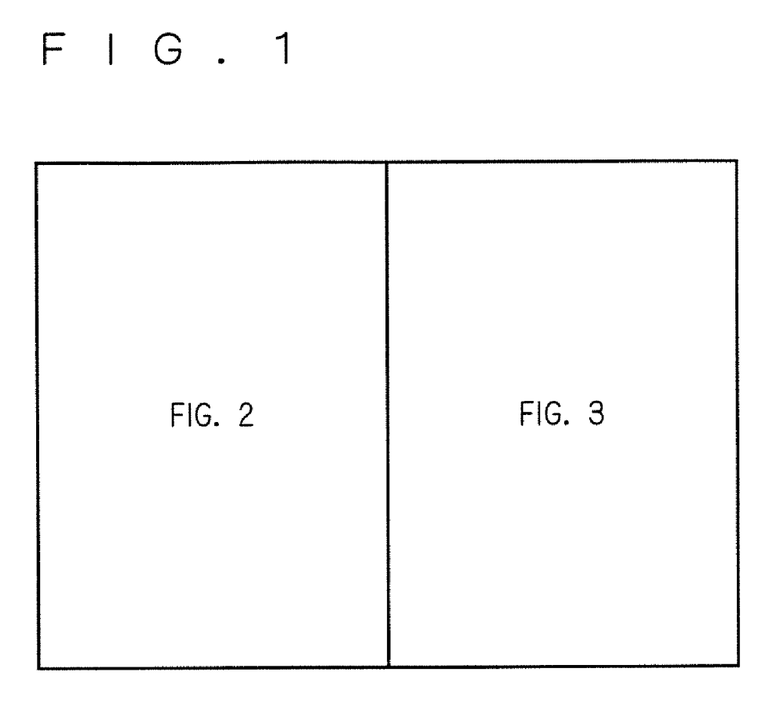
FIG. 1 is a combined diagram of FIGS. 2 and 3.
Figure 2:
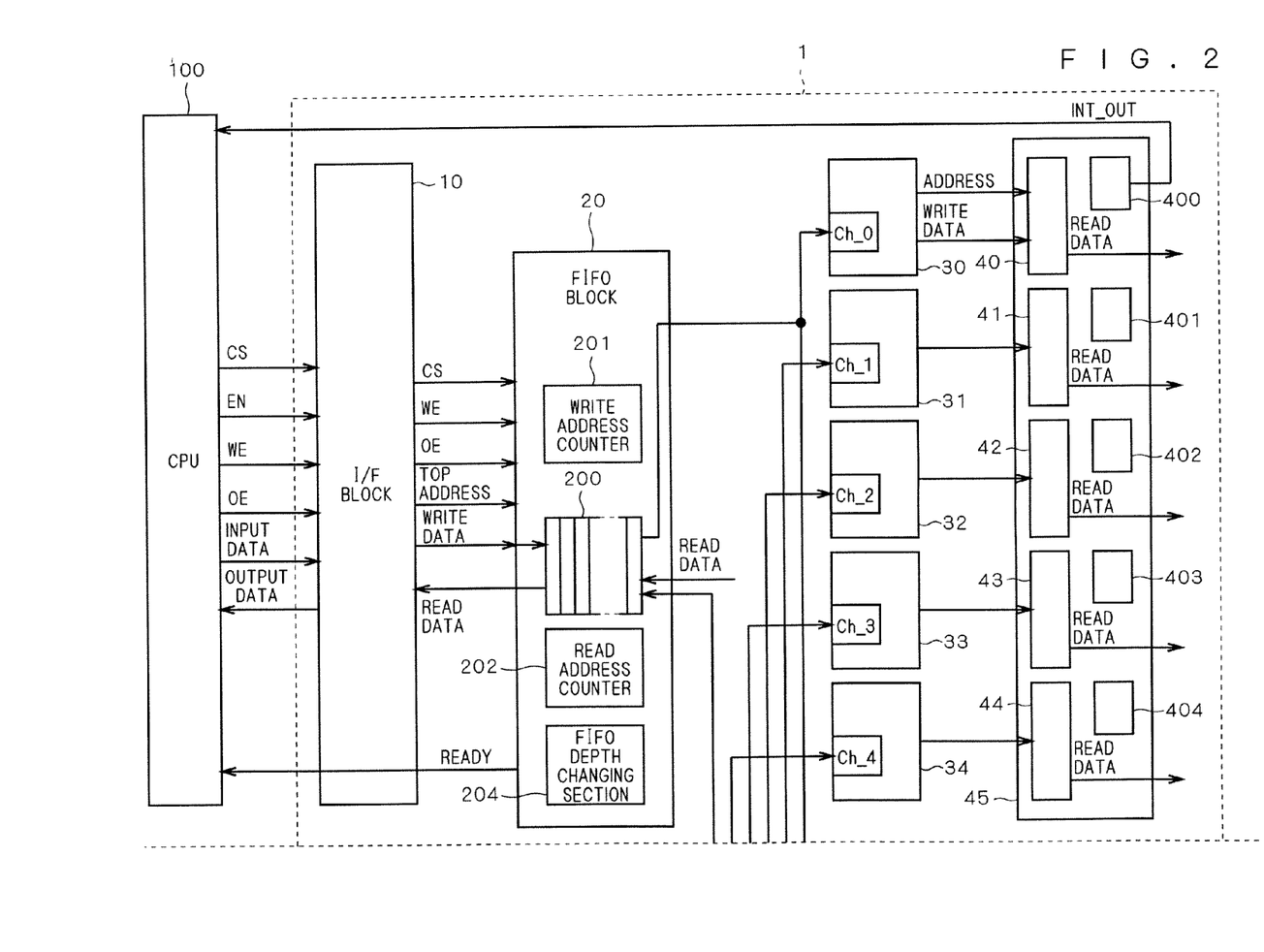
FIGS. 2 and 3 illustrate a general configuration of a multiprocessor system including a memory device according to a first preferred embodiment.
Figure 3:
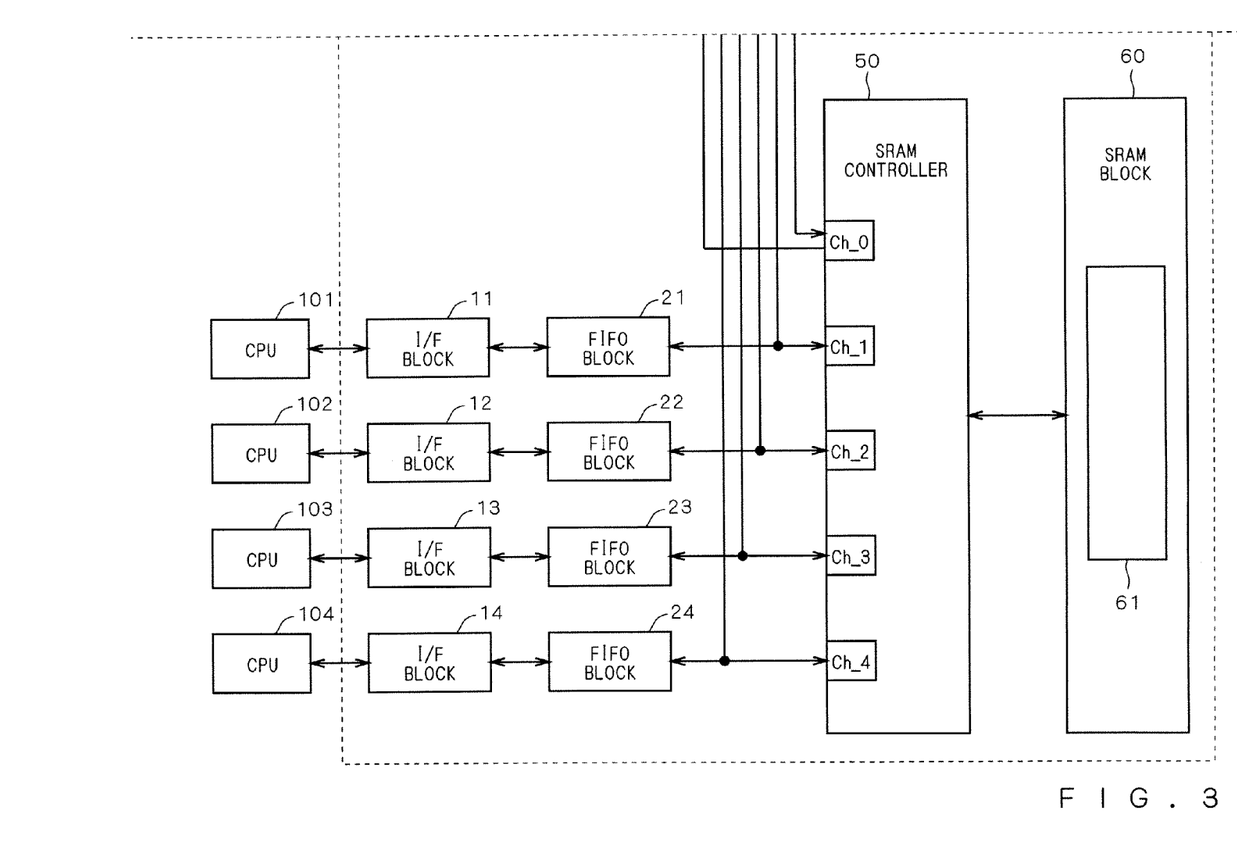

FIGS. 1 to 3 illustrate a general configuration of a multiprocessor system including a memory device according to the present invention. FIG. 1 is a combined diagram of FIGS. 2 and 3, and FIGS. 2 and 3 illustrate the multiprocessor system.

The multiprocessor system includes CPUs 100 to 104, and a memory device 1. The memory device 1 includes I/F blocks 10 to 14, FIFO blocks 20 to 24, register controllers 30 to 34, an individual registers block 45, a SRAM controller 50, and a SRAM block 60. The I/F blocks 10 to 14, the FIFO blocks 20 to 24, and the register controllers 30 to 34 are provided in a corresponding manner the CPUs 100 to 104, respectively.

A general description of the memory device 1 is given briefly, and then a detailed description will be presented.

The individual registers block 45 includes individual registers 40 to 44, and interrupt processing sections 400 to 404. The individual registers 40 to 44 can be written with data exclusively only by the corresponding CPUs 100 to 104, respectively, and are readable by all of the CPUs 100 to 104.

The interrupt processing sections 400 to 404 will be described in a fourth preferred embodiment.

The SRAM block 60 includes a shared SRAM 61. The shared SRAM 61 is writable and readable by all of the CPUs 100 to 104.

The I/F blocks 10 to 14 are communication interfaces that realize data communications between the CPUs 100 to 104 and the memory device 1, respectively, and are parallel I/Fs, for example.

The FIFO blocks 20 to 24 are connected to the I/F blocks 10 to 14, respectively, and allow smooth input even at the occurrence of waiting in a process by the SRAM controller 50 in a subsequent stage. The FIFO block 20 includes a FIFO depth changing section 204, which will be described in a fifth preferred embodiment.

The register controllers 30 to 34 are connected to the FIFO blocks 20 to 24, respectively. The register controller 30 receives write data from the CPU 100 via the I/F block 10 and the FIFO block 20, and writes the write data in the individual register 40. The register controller 30 recognizes a memory map shown in FIG. 4, and writes the write data exclusively only in the corresponding individual register 40. The register controllers 31 to 34 operate in the same way as the register controller 30. Namely, the CPUs 100 to 104 write data in their corresponding individual registers 40 to 44, respectively.

The individual register 40 is connected to the FIFO blocks 20 to 24 not via the register controller 30 (not shown). Namely, all of the CPUs 100 to 104 can read read data from the individual register 40 via the I/F blocks 10 to 14 and the FIFO blocks 20 to 24, respectively. Likewise, each of the individual registers 41 to 44 is connected to the FIFO blocks 20 to 24 not via the register controllers 31 to 34, so that all of the CPUs 100 to 104 can read read data independently from all areas of the individual registers 40 to 44.

The CPUs 100 to 104 can always write data only in their corresponding individual registers 40 to 44, respectively (regardless of access operations to the individual registers by the other CPUs). Also, the CPUs 100 to 104 can always read data independently from all areas of the individual registers 40 to 44 (regardless of access operations to the individual registers by the other CPUs).

The SRAM controller 50 writes write data from the FIFO blocks 20 to 24 in the shared SRAM 61, and outputs read data read from the shared SRAM 61 to the FIFO blocks 20 to 24. The SRAM controller 50 also has the function of adjusting and executing accesses when the FIFO blocks 20 to 24 access (write/read) the shard SRAM 61 simultaneously.

Accordingly, data communication from the CPU 100 to the CPU 101 can be conducted when the CPU 100 writes data in the individual register 40 via the I/F block 10, the FIFO block 20 and the register controller 30, and the CPU 101 reads the data from the individual register 40 via the I/F block 11 and the FIFO block 21, for example. Data communication from the CPU 100 to the CPU 101 can also be conducted when the CPU 100 writes data in the shared SRAM 61 via the I/F block 10, the FIFO block 20 and the SRAM controller 50, and the CPU 101 reads the data from the shared SRAM 61 via the I/F block 11, the FIFO block 21 and the SRAM controller 50.

Data of small transmission capacity such as a command is communicated via the individual registers 40 to 44, while data of large transmission capacity such as actual data is communicated via the shared SRAM 61.

Next, a detailed description is given of the configuration of the memory device 1. By way of examples, the I/F block 10, the FIFO block 20, the register controller 30, the individual register 40, the SRAM controller 50, and the shared SRAM 61 will be discussed.

The I/F block 10 receives a chip select signal (hereafter called a CS signal), an access enable signal (hereafter called an EN signal), a write enable signal (hereafter called a WE signal), an output enable signal (hereafter called an OE signal), and input data from the CPU 100. The CS signal falls to L at the start of a series of writing/reading processes of the CPU 100, and rises to H upon completion (Active L).

If the input CS signal is an asynchronous signal, for example, the I/F block 10 removes metastables from the CS signal via a two-stage flip-flop and then subjects the CS signal to noise filtering and the like to remove short noise pulses of two clocks or less, to output the resulting CS signal to the FIFO block 20.

The I/F block 10 outputs the OR result of the input EN signal and WE signal as a WE signal in the subsequent stage to the FIFO block 20, and outputs the OR result of the input EN signal and OE signal as an OE signal in the subsequent stage to the FIFO block 20. Namely, the CPU 100 sets the EN signal and the WE signal to H when writing data, and sets the EN signal and the OE signal to H when reading data. Like the CS signal, if the WE signal and the OE signal are asynchronous signals, the I/F block 10 outputs these signals after removing metastables from them via a two-stage flip-flop.

Figure 5:
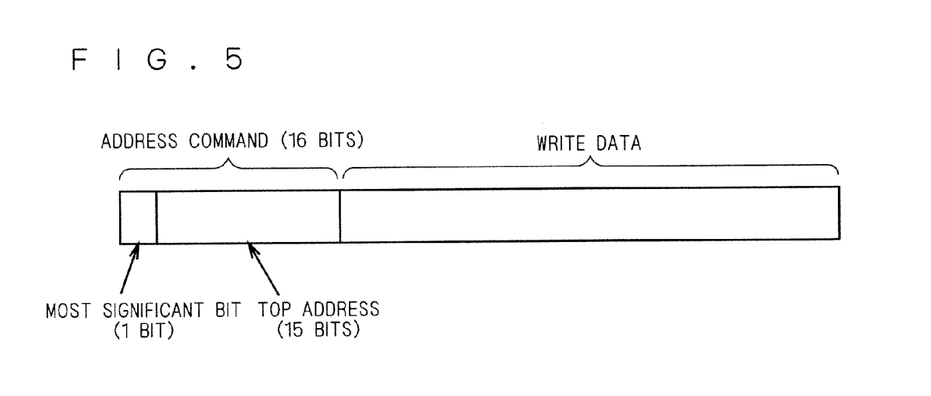
FIG. 5 illustrates input data.

As shown in FIG. 5, the input data has the first 16 bits arranged as an address command and the subsequent bits arranged as write data which is actual data. Of the 16 bits of address command, the most significant bit indicates writing or reading, and the remaining 15 bits indicate a top address at which the writing or reading is started. The most significant bit is "1" for writing, for example.

The I/F block 10 extracts the 16 bits of address command from the input data, and further extracts the most significant bit and the low-order 15 bits of top address from the address command. The I/F block 10 then outputs the most significant bit and the top address to the FIFO block 20. When the most significant bit is "1", the I/F block 10 then outputs write data to the FIFO block 20. When the most significant bit is "0", the I/F block 10 then reads read data from the FIFO block 20 and outputs the read data to the CPU 100.

The FIFO block 20 includes a FIFO 200, a write address counter 201, and a read address counter 202. The FIFO block 20 receives the CS signal, the WE signal, the OE signal, the most significant bit, the top address, and write data.

First, when the most significant bit of the address command is "1", the FIFO block 20 records sequentially input write data in the FIFO 200.

The write address counter 201 increments the address (top address) by 1 each time 1 byte of write data is written in the FIFO 200, for example. When the write data reaches a prescribed depth of the FIFO 200, the FIFO block 20 causes a READY signal to fall to L, and then outputs the write data and address to the register controller 30 or the SRAM controller 50. The READY signal being H indicates that the FIFO 200 is accessible, and is communicated to the CPU 100.

When the FIFO 200 is emptied, the FIFO block 20 causes the READY signal to rise to H again. The FIFO block 20 repeats the same operation after that, to output write data and address to the register controller 30 or the SRAM controller 50.

On the other hand, when the most significant bit of the address command is "0", with the top address indicating one of the individual registers 40 to 44, the FIFO block 20 causes the READY signal to fall to L, to read read data from the top address and record the read data in the FIFO 200. Then, the FIFO block 20 causes the READY signal to rise to H again.

The read address counter 202 increments the address (top address) by 1 each time 1 byte of read data is written in the FIFO 200. The FIFO block 20 reads sequentially the read data from the incremented address, and records read data of the depth of the FIFO 200 in the FIFO 200. When all of the read data in the FIFO 200 are read by the CPU 100, the FIFO block 20 causes the READY signal to fall to L, and then causes the READY signal to rise to H when read data is recorded in the FIFO 200 again. The FIFO block 20 repeats the same operation after that, to record sequentially read data in the FIFO 200.

When the top address indicates the shared SRAM 61, the FIFO block 20 causes the READY signal to fall to L, to output the most significant bit and the top address to the SRAM controller 50. Then, the SRAM controller 50 writes read data of the top address in the FIFO 200, and the FIFO block 20 causes the READY signal to rise to H again.

The read address counter 202 increments the address (top address) by 1. The FIFO block 20 outputs sequentially the incremented addresses to the SRAM controller 50. Then, read data from the SRAM controller 50 are recorded in the FIFO 200, to be read sequentially by the CPU 100.

Upon input of an instruction to wait from the SRAM controller 50 regardless of writing or reading, the FIFO block 20 puts the operation into a "waiting" state while maintaining the data.

The register controller 30 receives the WE signal, an address and write data from the FIFO block 20, and writes the write data in the address. The register controller 30 performs the following process so that only the CPU 100 writes data exclusively in the individual register 40.

By way of example, when the CPU 100 tries to write data in the individual register 41, the register controller 30 recognizes the input top address as being outside the individual register 40, and ignores the write data. By way of another example, when 16 bytes of write data is written from a halfway address in the individual register 40 and reaches the most significant address of the individual register 40 with 3 bytes left, the register controller 30 writes the 3 bytes from the least significant address of the individual register 40.

The SRAM controller 50 receives the WE signal, an address and write data from the FIFO block 20, and writes the write data in the address (in the shared SRAM 61). The SRAM controller 50 also receives the OE signal and an address from the FIFO block 20, and reads read data at the address (in the shared SRAM 61) and records the read data in the FIFO 200.

Further, the SRAM controller 50 adjusts accesses from the CPUs 100 to 104 to the shared SRAM 61. More specifically, when the CPUs 100 to 104 access the shared SRAM 61 simultaneously, the SRAM controller 50 notifies the corresponding FIFO blocks 20 to 24 to wait before outputting to the SRAM controller 50.

The operation of the memory device 1 will now be described. Operation examples of the memory device 1 described below are cases where (1) the CPU 100 writes data in the individual register 40, (2) the CPU 100 reads data from the individual register 41, (3) the CPU 100 writes data in the shared SRAM 61, and (4) the CPU 101 reads data from the shared SRAM 61.

(1) When the CPU 100 writes data in the individual register 40

Figure 6:
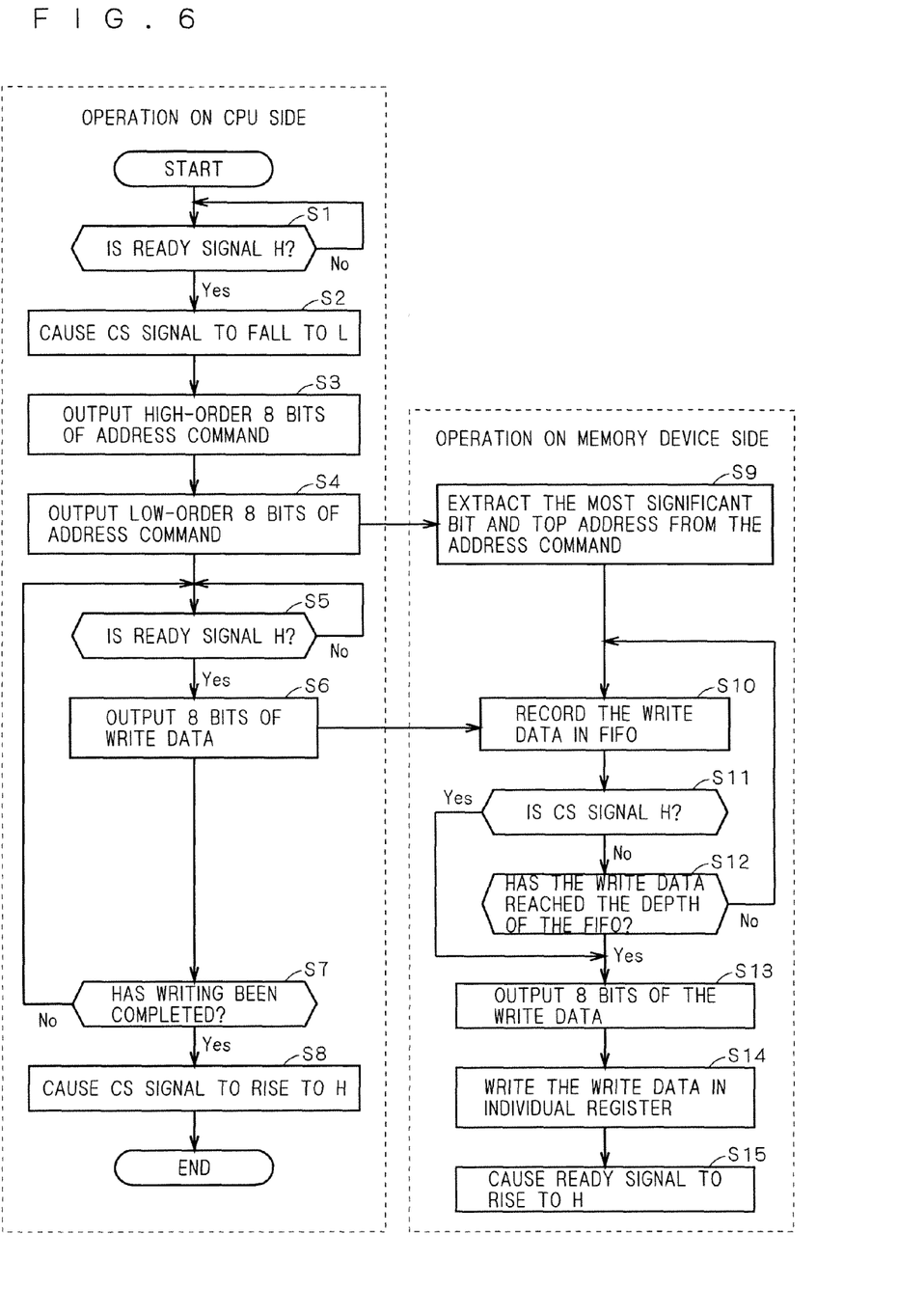
FIG. 6 is a flowchart of writing operation.

FIG. 6 is a flowchart of operation when the CPU 100 writes data in the individual register 40. FIG. 6 depicts the operation of the CPU 100, and the operation of the memory device 1 which corresponds to the operation of the CPU 100.

First in step S1, the CPU 100 determines whether the READY signal is H. If the READY signal is determined to be L, which means that the FIFO block 20 is inaccessible, step S1 is executed again. If the READY signal is determined to be H, the CPU 100 causes the CS signal to fall to L in step S2.

Then in step S3, the CPU 100 causes the EN signal and the WE signal to fall to L, to output high-order 8 bits for example of input data to the I/F block 10. The CPU 100 then causes the EN signal and the WE signal to rise to H.

Then in step S4, the CPU 100 causes the EN signal and the WE signal to fall to L, to output the next 8 bits of input data to the I/F block 10. The CPU 100 then causes the EN signal and the WE signal to rise to H.

At this time, on the memory device 1 side, the I/F block 10 that has received the address command consisting of the high-order 8 bits and the next 8 bits of the input data outputs the most significant bit and a top address of the address command to the FIFO block 20 in step S9. Note that in this case, the most significant bit is "1" (writing), and the top address is an address value in the individual register 40.

Next, on the CPU 100 side, the CPU 100 determines whether the READY signal is H in step S5. If the READY signal is L, step S5 is executed again. If the READY signal is H, the CPU 100 causes the EN signal and the WE signal to fall to L, to output 8 bits of write data for example to the I/F block 10 in step S6, and then causes the EN signal and the WE signal to rise to H again. The CPU 100 then executes steps S5 to S7 repeatedly until it determines in step S7 that all of write data has been output.

When all of write data of the address is output, the CPU 100 causes the CS signal to rise to H in step S8. On the memory device 1 side, in step S10, the I/F block 10 outputs the input write data to the FIFO block 20, and the FIFO block 20 writes the write data in the FIFO 200. The write address counter 201 increments the address (top address) by 1 each time 1 byte of write data is written in the FIFO 200, for example. The address is not incremented with the first write data.

Then in step S11, the FIFO block 20 determines whether the CS signal is H. If the CS signal is L, which means that all of write data has not been output, the FIFO block 20 determines in step S12 whether data can be subsequently written in the FIFO block 20, namely, whether the write data in the FIFO 200 has reached the depth (e.g. 8 bytes) of the FIFO 200. When the depth has not been reached, the memory device 1 executes steps S10 to S12 repeatedly upon input of write data from the CPU 100 (step S6).

When the write data reaches the depth of the FIFO 200, the FIFO block 20 causes the READY signal to fall to L, to output 8 bits of write data in step S13. If all of write data has not been output at this point, the CPU 100 determines that the READY signal is L in step S5, and executes step S5 repeatedly until the READY signal becomes H.

Next, when all of write data from the CPU 100 has been output and the CS signal becomes H, or when the write data reaches the FIFO depth, the FIFO block 20 outputs the write data and address in the FIFO 200 to the register controller 30 in step S14. When the address is in the individual register 40, the register controller 30 writes sequentially the write data in the address. When the top address is outside the individual register 40, the register controller 30 invalidates the write data. When the top address is in the individual register 40 but the incremented address is outside the individual register 40, the register controller 30 writes the write data from the least significant address of the individual register 40.

Then in step S15, the FIFO block 20 causes the READY signal to rise to H when the FIFO 200 is emptied. If the CPU 100 has been repeating step S5 at this point, the CPU 100 outputs 8 bits of write data again (step S6). Then, the CPU 100 executes steps S5 to S7 repeatedly. Each time the CPU 100 outputs 8 bits of write data (step S6), the memory device 1 executes steps S10 to S15 repeatedly.

Then, when the CPU 100 determines that all of write data has been output in step S7, the CPU 100 causes the CS signal to rise to H in step S8. Meanwhile, when the FIFO block 20 determines that the CS signal is H in step S11, the FIFO block 20 executes steps S13 to S15 to write the remaining write data in the FIFO 200 in the individual register 40. In this manner the FIFO block 20 functions as a buffer in storing write data from the CPU 100 in the individual register 40.

(2) When the CPU 100 reads data from the individual register 41

Figure 7:
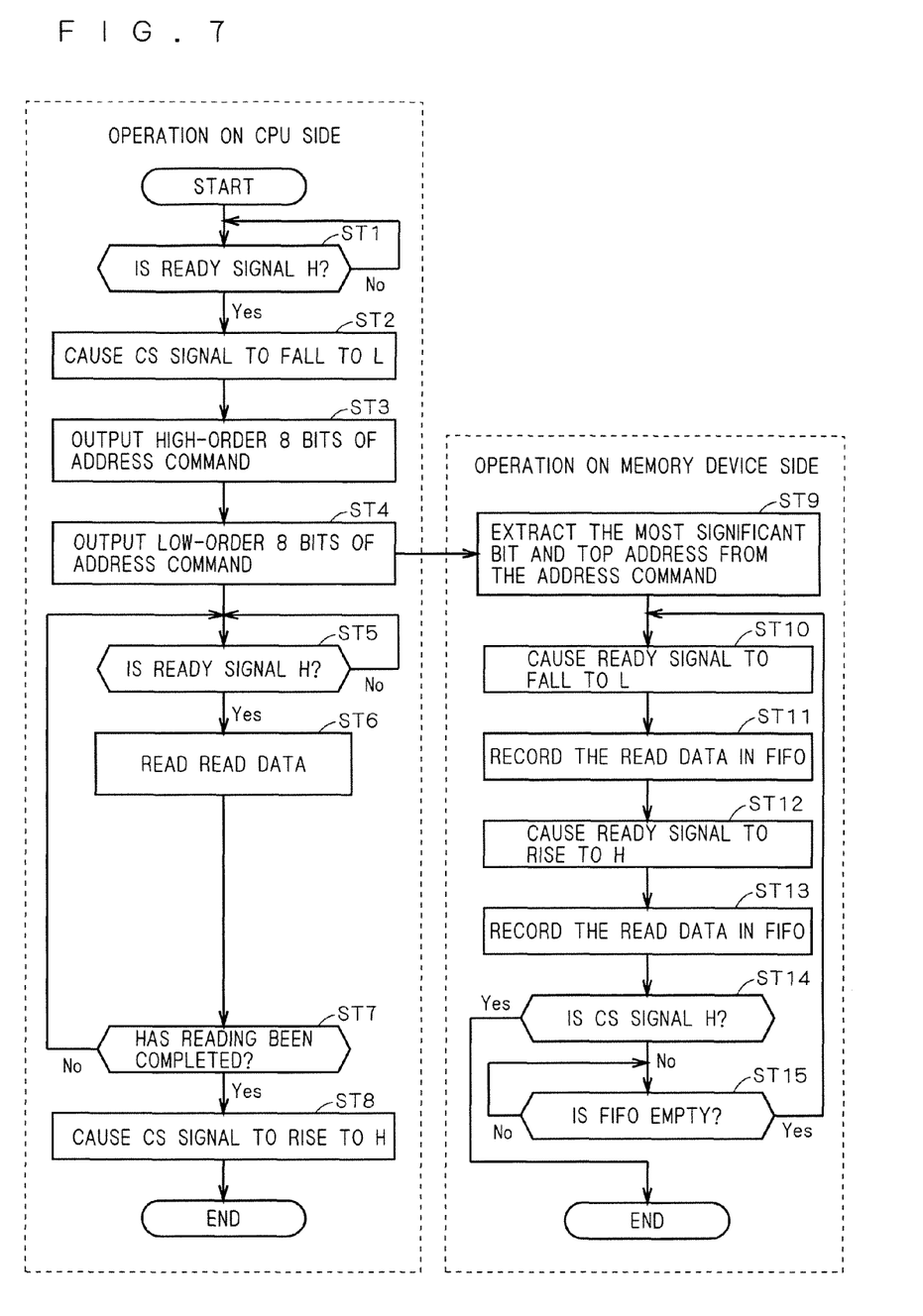
FIG. 7 is a flowchart of reading operation.

Referring to FIG. 7, an operation when the CPU 100 reads data from the individual register 41 will be described.

Steps ST1 to ST5 and ST9 are the same operation as steps S1 to S5 and S9 described above in (1). Note that in this case, the input data only includes an address command, the most significant bit is "0", and the top address is an address value in the individual register 41.

After step ST9, the FIFO block 20 causes the READY signal to fall to L in step ST10. At this time, the CPU 100 determines that the READY signal is L in step ST5, and executes step ST5 repeatedly.

Then in steps ST11 to ST13, the FIFO block 20 reads data (8 bytes) of the depth of the FIFO 200 from the individual register 41. More specifically, first in step ST11, the FIFO block 20 extracts read data from the individual register 41 indicated by the top address, and records the data in the FIFO 200.

Then in step ST12, the FIFO block 20 causes the READY signal to rise to H. At this time, the CPU 100 determines that the READY signal is H in step ST5, and reads without stopping 8 bytes (the depth of the FIFO 200) of read data recorded in the FIFO 200 via the I/F block 10 in step ST6. Then, the CPU 100 executes steps ST5 to ST7 repeatedly until it determines in step ST7 that reading has been completed.

In the FIFO block 20, meanwhile, the read address counter 202 increments the address (top address) by 1, and the FIFO block 20 reads sequentially the read data from the incremented address, and records read data of the depth (8 bytes) of the FIFO 200 in the FIFO 200. As the internal operation of the memory device 1 (step ST12) is faster than the operation of the CPU 100 (step ST8) via an external port, the CPU 100 can read the 8 bytes of read data from the FIFO 200 without having to determining the READY signal in step ST5.

Then in step ST14, the FIFO block 20 determines whether the CS signal is H. If the CS signal is L, further read data needs to be supplied to the CPU 100. In step ST15, the FIFO block 20 determines whether all of read data in the FIFO 200 has been read. If all of read data has not been read, step ST1 5 is executed again. If all of read data has been read, steps ST10 to ST15 are executed repeatedly.

Then, when the CPU 100 determines that reading has been completed in step ST7, the CPU 100 causes the CS signal to rise to H in step ST8. Upon transition to H of the CS signal, on the memory device 1 side, the FIFO block 20 determines that the CS signal is H in step ST14 and stops the reading operation.

(3) When the CPU 100 writes data in the shared SRAM 61

An operation when the CPU 100 writes data in the shared SRAM 61 is different only in step S14 from the operation shown in FIG. 6. Thus the steps other than step S14 will not be discussed.

In step ST14, the FIFO block 20 notifies the SRAM controller 50 of writing (outputs the most significant bit, for example). When performing an access operation from another CPU, the SRAM controller 50 notifies the FIFO block 20 to wait before outputting. The notified FIFO block 20 maintains the write data and address, and outputs the write data and address upon permission from the SRAM controller 50.

The SRAM controller 50 that has received the write data and address writes the write data in the shared SRAM 61.

(4) When the CPU 100 reads data from the shared SRAM 61

An operation when the CPU 100 reads data from the shared SRAM 61 is different only in steps ST11 and ST13 from the operation shown in FIG. 7. Thus the steps other than steps ST11 and ST13 will not be discussed.

In step ST11, the FIFO block 20 notifies the SRAM controller 50 of reading (outputs the most significant bit, for example). When performing an access operation from another CPU, the SRAM controller 50 notifies the FIFO block 20 to wait before reading. The notified FIFO block 20 maintains the address, and outputs the top address upon permission from the SRAM controller 50.

The SRAM controller 50 that has received the top address extracts read data from the shared SRAM 61 and outputs the read data to the FIFO block 20. The FIFO block 20 receives the read data and writes the read data in the FIFO 200.

Then in step ST12, the FIFO block 20 causes the READY signal to rise to H. Then in step ST13, the FIFO block 20 records the read data sequentially input from the SRAM controller 50 in the FIFO 200.

The above operations (1) to (4) were described with reference to the CPU 100, but are applied to the CPUs 101 to 104 as well. That is, data can be transmitted when the CPU 100 writes data in the individual register 40, and the CPU 101 reads the data. Further, data communication can be conducted at high response speed because the individual registers are always accessible (regardless of access operations to the individual registers by the other CPUs).

Likewise, data can be transmitted via the shared SRAM 61. Note that the SRAM controller 50 executes access from each CPU by the depth of the FIFO, as described above. Also, the internal operation of the memory device 1 is faster than the operation of the CPU via an external port. Thus by way of example, the SRAM controller 61 can process access data from the CPU 101 at high speed while access data from the CPU 100 is being recorded in the FIFO. Therefore, when a plurality of CPUs access the shared SRAM 61, the external CPU can conduct data communication at high response speed.

Each data that is transmitted via the individual register or the shared SRAM passes through the FIFO. As the individual registers are always accessible regardless of operations by the other CPUs, data can usually be transmitted between the CPUs via an individual register without passing through the FIFO. Yet data transmission via an individual register has the following advantage by being conducted via the FIFO.

Assume that data is transmitted via the shared SRAM, and then a command is transmitted via an individual register. When the data transmission is adjusted by the SRAM controller and put into a waiting state at the FIFO, and if the command is transmitted without passing through the FIFO, then the command transmission is completed earlier than the data transmission. This changes the order of transmission, resulting in a malfunction in communication between the CPUs.

Meanwhile in the first preferred embodiment, when data transmission is adjusted by the SRAM controller and put into a waiting state at the FIFO, a command transmitted via an individual register also passes through the FIFO, which prevents the command transmission from being completed earlier than the data transmission. This is because with the adjustment by the SRAM controller, the FIFO block causes the READY signal to fall to L, preventing the CPU from conducting the command transmission. The order of transmission is thus not changed, thus avoiding a malfunction in communication between the CPUs. In this regard, communications between the CPUs are ensured by hardware, thereby increasing reliability of the memory device 1.

Second Preferred Embodiment

A memory device according to a second preferred embodiment of the present invention will be described. A general configuration of the memory device according to the second preferred embodiment is the same as that of the first preferred embodiment. In the first preferred embodiment where the shared SRAM 61 is writable and readable by all of the CPUs 100 to 104, important data having been written in the shared SRAM 61 by the CPU 100 may be overwritten and erased by the other CPUs 101 to 104, for example. Therefore in the second preferred embodiment, areas that are writable exclusively only by the CPUs 100 to 104, respectively, in the shared SRAM 61 are set.

Further, the CPUs 100 to 104 operate by making a selection between a state where all areas in the shared SRAM 61 are writable by the CPUs 100 to 104 (which is called a write mode) and a state where only set areas in the shared SRAM 61 are writable by the CPUs 100 to 104, respectively (which is called an exclusive write mode). In either state, all areas in the shared SRAM 61 are readable by all of the CPUs 100 to 104.

Figure 4:
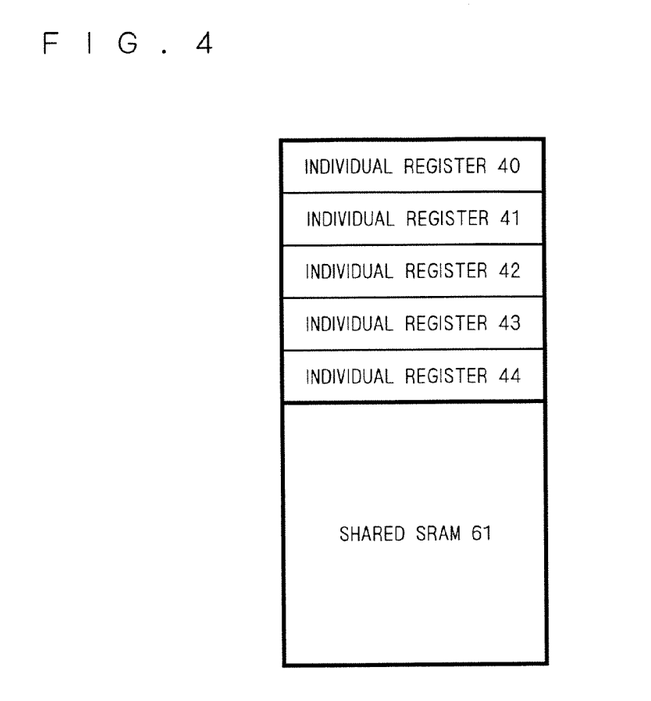
FIG. 4 illustrates individual registers and a shared SRAM.

More specifically, the individual register 40 is provided with an area for setting WPTEN_i that indicates whether each CPUi (i=an integer of 100 to 104) operates in the write mode or exclusive write mode, and WPRT_i (which corresponds to area information) that indicates a writable area exclusively only by each CPUi.

The aforementioned area is connected to the SRAM controller 50. When WPTEN_i and WPRT_i are written in the individual register 40, the SRAM controller 50 restricts access from the CPUs 100 to 104 to the shared SRAM 61 based on WPTEN_i and WPRT_i.

An operation when the CPU 100 operates in the exclusive write mode is described. First, the CPU 100 writes "1" in WPTEN_100 in the individual register 40. WPTEN_i being "1" indicates the exclusive write mode.

Then, the CPU 100 sets (writes) a writable area only by the CPU 100 in the shared SRAM 61 in WPRT_100 in the individual register 40.

The SRAM controller 50 then restricts writing from the CPU 100 to the area indicated in WPRT_100 based on WPTEN_100 and WPRT_100. More specifically, when the address of write data from the CPU 100 is in an area other than the area indicated in WPRT_100, for example, the SRAM controller 50 invalidates the write data. Also, when the addresses of write data from the other CPUs 101 to 104 are in the area indicated in WPRT_100, the SRAM controller 50 invalidates (prohibits) the write data.

An operation when the CPU 100 operates in the write mode is now described. First, the CPU 100 writes "0" in WPTEN_100 in the individual register 40. WPTEN_i being "0" indicates the write mode. The SRAM controller 50 then executes writing from the CPU 100 in all areas in the shared SRAM 61 based on WPTEN_100.

As such, in the memory device according to this embodiment, a selection can be made on a CPU by CPU basis between a state where all areas in the shared SRAM 61 are writable by the CPUs 100 to 104 and a state where only set areas in the shared SRAM 61 are writable exclusively by the CPUs 100 to 104, respectively. This protects data written in the shared SRAM 61 by a CPUi in the exclusive write mode.

WPTEN_i and WPRT_i are set only for the individual register 40. This means that only the CPU 100 can change the settings of WPTEN_i and WPRT_i. This is because if the CPUs 101 to 104 can freely change the settings of WPTEN_i and WPRT_i, their exclusive writable areas might overlap one another.

Third Preferred Embodiment

A memory device according to a third preferred embodiment of the present invention will be described. A general configuration of the memory device according to the third preferred embodiment is the same as that of the first preferred embodiment. The memory device according to the third preferred embodiment is further capable of parallel communication and serial communication compared to that of the first preferred embodiment.

Figure 8:
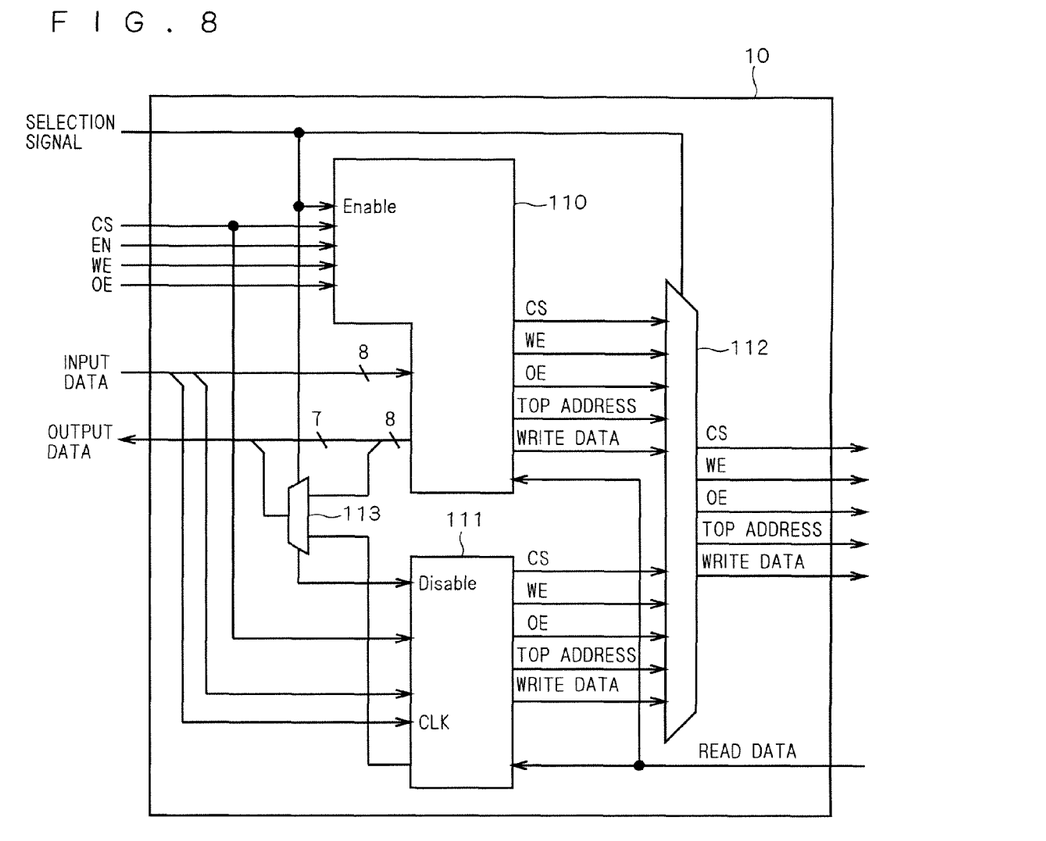
FIG. 8 illustrates a general configuration of an I/F block.

FIG. 8 illustrates a general configuration of the I/F block 10. The I/F block 10 will be specifically described with reference to FIG. 8.

The I/F block 10 includes a parallel I/F 110, a serial I/F 111, and multiplexers 112 and 113. The I/F blocks 11 to 14 have the same configuration as the I/F block 10, so the I/F block 10 will be discussed by way of example.

The I/F block 10 receives a selection signal. The selection signal is input as an enable signal to the parallel I/F 110, and as a disable signal to the serial I/F 111. Thus, the parallel I/F 110 is selected when the selection signal is H and the serial I/F 111 is selected when the selection signal is L.

The I/F block 10 also receives the CS signal, the EN signal, the OE signal, the WE signal, and input data from the CPU 100. The CS signal, the EN signal, the OE signal and the WE signal are the same as those described in the first preferred embodiment, and will thus not be discussed.

To be suited for parallel transmission, the input data is input to the parallel I/F 110 via 8 input lines that are necessary for 8-bit parallel transmission, for example. For serial transmission, the input data is input to the serial I/F 111 via one of the 8 input lines. A clock necessary for the serial I/F 111 is input to the serial I/F 111 via one of the 8 input lines other than the one for the input data.

Then, the parallel I/F 110 and the serial I/F 111 each extract a top address from the input data, and output the top address and write data to the multiplexer 112.

The multiplexer 112 connects one of the parallel I/F 110 and the serial I/F 111 to the FIFO block 20 selectively based on the selection signal. The multiplexer 112 then outputs the CS signal, the WE signal, the OE signal, the top address and write data from the parallel I/F 110 to the FIFO block 20 when the selection signal is H, and outputs the CS signal, the WE signal, the OE signal, the top address and write data from the serial I/F 111 to the FIFO block 20 when the selection signal is L.

Further, read data from the FIFO block 20 is input to the parallel I/F 110 and the serial I/F 111. The parallel I/F 110 and the serial I/F 111 convert the read data to data suited for parallel transmission and serial transmission, respectively, and output the converted data to the multiplexer 113.

The multiplexer 113 connects one of the parallel I/F 110 and the serial I/F 111 to the CPU 100 selectively based on the selection signal. The multiplexer 113 then outputs the read data from the parallel I/F 110 to the CPU 100 when the selection signal is H, and outputs the read data from the serial I/F 111 to the CPU 100 when the selection signal is L. To be suited for parallel transmission, the data is output from the parallel I/F 110 to the CPU 100 via 8 output lines that are necessary for 8-bit parallel transmission, for example. On the other hand, the data is output from the serial I/F 111 to the CPU 100 via one of the 8 input lines.

Seven bits of the output data (7 lines of the output lines) from the parallel I/F 110 to the CPU 100 are directly connected to the CPU 100, and 1 bit (one of the output lines) of the output data from the serial I/F 111 and output data from the parallel I/F 110 is selectively connected to the CPU 100 by the multiplexer 113.

Although the timing of input data varies between parallel transmission and serial transmission, the difference in timing can be absorbed by the FIFO block 20.

As such, the memory device according to the third preferred embodiment is capable of parallel transmission and serial transmission based on the selection signal without having to physically change the connection between the CPU 100 and the I/F block 10.

In addition, the CPU 100 can set the transmission modes of the CPUs 101 to 104 in the individual register 40. When values set in the individual register 40 by the CPU 100 are connected to each of the I/F blocks 21 to 24 as a selection signal, the CPU 100 individually determines the transmission modes of the CPUs 101 to 104. The I/F block 10 has a selection signal line input with a pin (defines a selection signal by external signal input), to predetermine the transmission mode of the CPU 100. This avoids a malfunction such as inaccessibility that can occur when the transmission mode of first access is unknown for lack of determination on the transmission mode of the CPU 100.

As described above, the memory device according to the third preferred embodiment is capable of both serial transmission and parallel transmission. This memory device is applicable to a system having only one of the transmission functions. Moreover, the CPU 100 can individually set the transmission modes of the CPUs 101 to 104.

Fourth Preferred Embodiment

Figure 9:
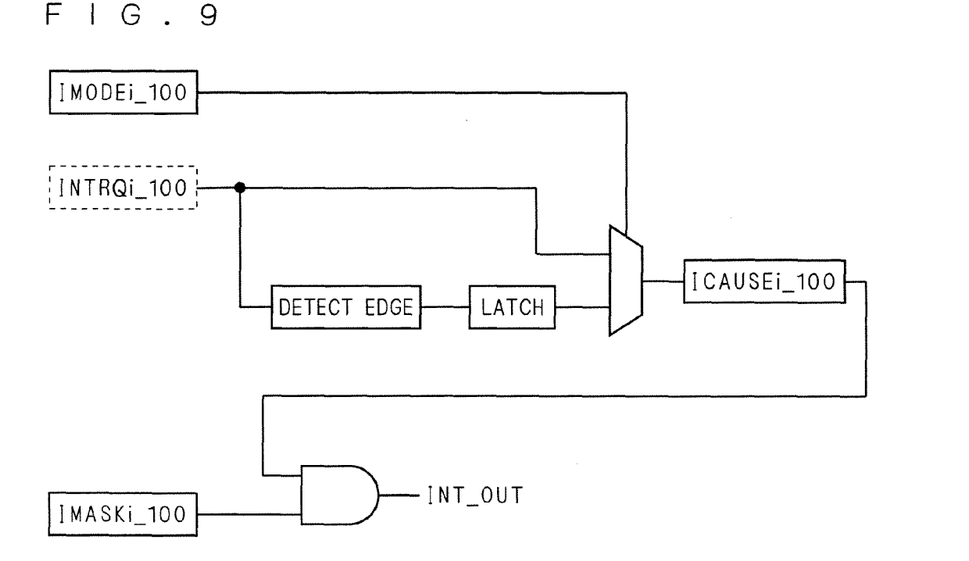
FIGS. 9 and 10 are schematic diagrams of parts of the function of an interrupt processing section.

Referring to FIG. 9, a memory device according to a fourth preferred embodiment of the present invention will be described. A general configuration of the memory device according to the fourth preferred embodiment is the same as that of the first preferred embodiment. The interrupt processing sections 400 to 404 performing interrupt processes between the CPUs will be described in this embodiment.

The individual registers block 45 includes the interrupt processing sections 400 to 404. The outputs of the interrupt processing sections 400 to 404 are connected to the CPUs 100 to 104, respectively. The interrupt processing section 400 provided in a corresponding manner to the CPU 100 recognizes interrupt request parameters (described later) written in the individual registers 40 to 44, and outputs an interrupt signal (INT_OUT signal) to the CPU 100. Like the interrupt processing section 400, the interrupt processing sections 401 to 404 output the INT_OUT signals to the CPUs 101 to 104, respectively.

A description is given of the interrupt request parameters set for the individual registers 40 to 44. Parameters INTRQ100_i, ICAUSEi_100, IMASKi_100, and IMODEi_100 are set for the individual register 40, for example. These parameters are set for the individual registers 41 to 44 as well.

Each of the parameters will be described together with the function of the interrupt processing section 400. FIG. 9 is a schematic diagram of the function of the interrupt processing section 400. The parameters enclosed in solid lines are parameters set for the individual register 40, and the parameter enclosed in dashed lines is a parameter set for an individual register corresponding to a CPUi.

The parameter INTRQi_100 indicates an interrupt request from a CPUi (i=an integer of 100 to 104) to the CPU 100.

The parameter IMASKi_100 indicates whether the CPU 100 accepts an interrupt from a CPUi. As shown in FIG. 9, the interrupt processing section 400 outputs an AND of IMASKi_100 and ICAUSEi_100 as the INT_OUT signal. Thus an interrupt is prohibited when IMASKi_100 is "0".

The parameter ICAUSEi_100 is for outputting the INT_OUT signal, and the INT_OUT signal is output when the parameter ICAUSEi_100 is "1". Of course, the INT_OUT signal is not output when IMASKi_100 is "0".

The parameter IMODEi_100 is for selecting a condition that makes ICAUSEi_100 "1". More specifically, the parameter IMODEi_100 makes a selection between a mode where the leading edge of INTRQi_100 is detected to make ICAUSEi_100 "1" (called an edge mode), and a mode where the level ("1" or "0") of INTRQi_100 becomes ICAUSEi_100 without change (called a level mode).

Next, a description is given of an interrupt operation when the CPU 101 interrupts the CPU 100. First, the CPU 100 writes "1" for example in IMASK101_100 (interrupt mask from the CPU 101 to the CPU 100) in the individual register 40 in order to accept the interrupt request to itself.

To determine whether a trigger of the interrupt request from the CPU 101 to the CPU 100 is accepted in the level mode or the edge mode, the CPU 100 writes "1" for example in IMODE101_100 in the individual register 40. IMODEi_100 being "0" indicates the level mode, and IMODEi_100 being "1" indicates the edge mode.

In this manner the condition of the interrupt process to the CPU 100 is set first. The CPU 101 then makes an interrupt request to the CPU 100. More specifically, the CPU 101 writes "1" in INTRQ101_100 (interrupt request from the CPU 101 to the CPU 100) in the individual register 41.

The interrupt processing section 400 determines ICAUSE101_100 based on INTRQ101_100 set for the individual register 41 and IMODE101_100 set for the individual register 40 (see FIG. 9). More specifically, as IMODE101_100 is "1" (edge mode), the interrupt processing section 400 detects the leading edge of INTRQ101_100, to make ICAUSE101_100 "1".

The interrupt processing section 400 then outputs an AND result of ICAUSE101_100 and IMASK101_100 as the INT_OUT signal to the CPU 100.

In the edge mode, the INT_OUT signal is output with the leading edge of INTRQ101_100 of the CPU 101 that generates an interrupt as a trigger. Thus the interrupt cannot be cleared even when the CPU 101 that generates an interrupt causes INTRQ101_100 of the individual register 41 to fall. For this reason, the interrupt is cleared when the CPU 100 that has received the interrupt writes "0" in ICAUSE101_100 in the individual register 40.

In the level mode (IMODE101_100 is "0"), on the other hand, the interrupt processing section 400 causes INTRQ101_100 of the individual register 41 to become ICAUSE101_100 without change (see FIG. 9). The interrupt processing section 400 then outputs an AND result of ICAUSE101_100 and IMASK101_100 as the INT_OUT signal to the CPU 100. Further, the CPU 101 that generates an interrupt makes INTRQ101_100 of the individual register 41 "0", causing ICAUSE101_100 to become "0" as well (see FIG. 9), thus clearing the interrupt.

Figure 10:
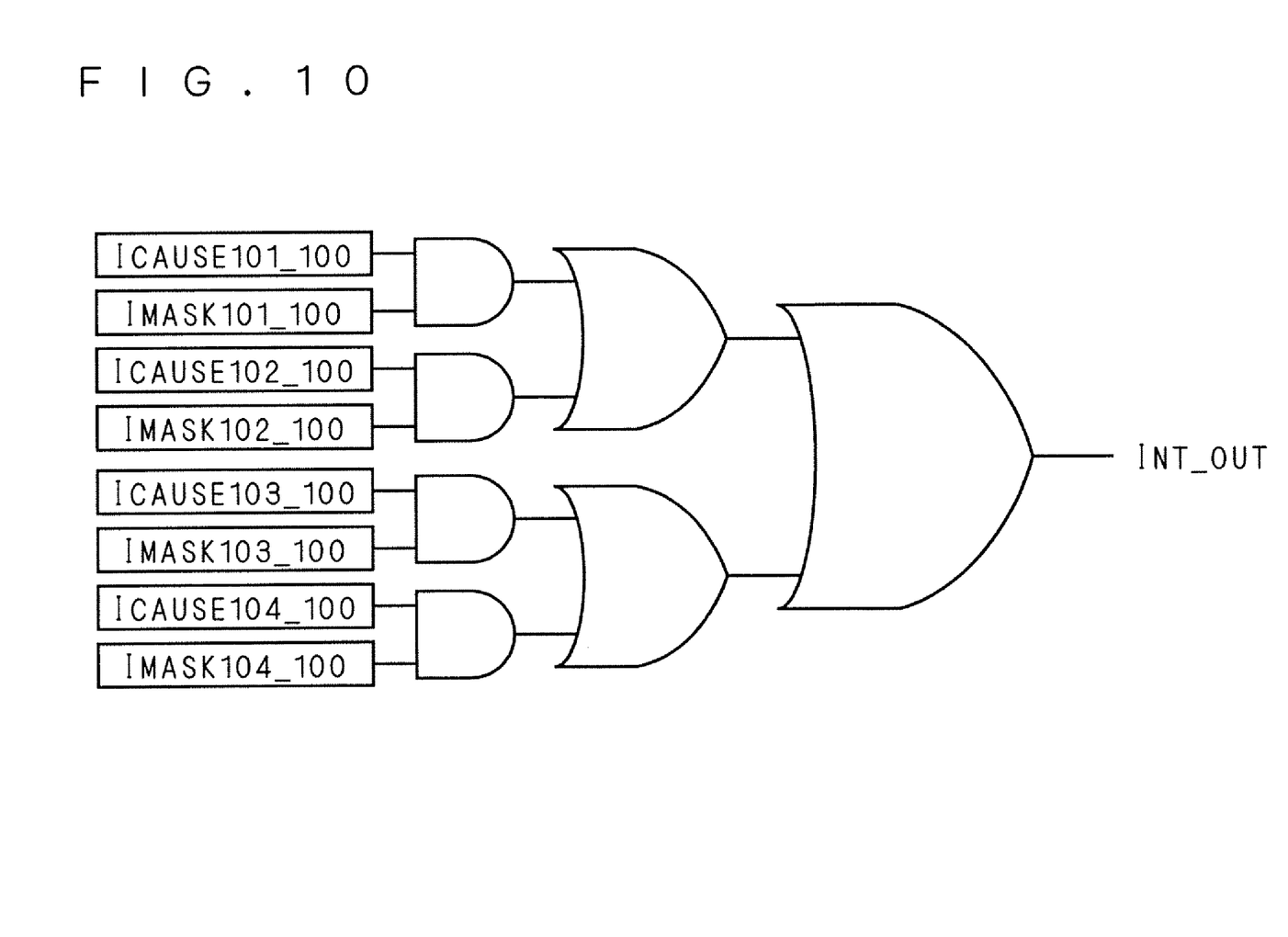

The INT_OUT signal to the CPU 100 was mentioned as an AND result of IMASK101_100 and ICAUSE101_100. Yet in actuality, the INT_OUT signal is output as "1" (H) to the CPU 100 when at least one of AND results of IMASKi_100 and ICAUSEi_100 is "1", as depicted in FIG. 10.

An interrupt to the CPUs 101 to 104 is made in the same way as the interrupt to the CPU 100 described above.

Thus, the CPUs 101 to 104 can interrupt the CPU 100 simultaneously, or conversely the CPU 100 can interrupt the CPUs 101 to 104 all at once. Further, since an interrupt request from a CPU is recorded in an individual register that is writable only by this CPU, the interrupt request can be processed independently of an interrupt operation of another CPU.

Moreover, since a selection can be made between the edge mode and the level mode as the trigger of an interrupt request, the memory device according to the fourth preferred embodiment is applicable to a system having only one of the functions.

The interrupt processing sections 400 to 404 do not need to be provided in the individual registers block 45, but may be provided separately.

Fifth Preferred Embodiment

A memory device according to a fifth preferred embodiment of the present invention will be described. A general configuration of the memory device according to the fifth preferred embodiment is the same as that of the first preferred embodiment. The FIFO depth changing sections 204, 214, 224, 234 and 244 (only the FIFO depth changing section 204 is illustrated in FIG. 1) included in the FIFO blocks 20 to 24, respectively, will be described in this embodiment.

The depths of the FIFOs included in the FIFO blocks 20 to 24 are set in the individual registers 40 to 44, respectively. For example, the individual register 40 is provided with an area for setting WFFDPTH0 that indicates a FIFO depth for writing, and RFFDPTH0 that indicates a FIFO depth for reading with respect to the FIFO 200. Likewise, the individual registers 41 to 44 are provided with areas for setting WFFDPTHs 1 to 4 and RFFDPTHs 1 to 4, respectively.

The CPUs 100 to 104 each write the depth of the FIFO corresponding to itself in the aforementioned area in the individual registers 40 to 44.

The FIFO depth changing sections 204, 214, 224, 234 and 244 are connected to the areas for setting WFFDPTHs 1 to 4 and RFFDPTHs 1 to 4 in the individual registers 40 to 44, respectively. The FIFO depth changing sections 204, 214, 224, 234 and 244 change the depths of the FIFOs included in the FIFO blocks 20 to 24, respectively.

Therefore, the depth of the FIFO corresponding to each of the CPUs 100 to 104 can be set at any depth. That is, the FIFO depth can be set deeper for a CPU having large amounts of access data to the shared SRAM 61, thereby performing the access process by priority.

The present invention has been described with the first to fifth preferred embodiments. Alternatively, the configurations of the respective embodiments may be combined with one another. That will attain a combined effect from the respective embodiments.

While the invention has been shown and described in detail, the foregoing description is in all aspects illustrative and not restrictive. It is therefore understood that numerous modifications and variations can be devised without departing from the scope of the invention.

What is claimed is:

1. A memory device accessible by a first CPU and a second CPU, comprising:
   a first FIFO corresponding to said first CPU;
   a second FIFO corresponding to said second CPU;
   a shared storage medium configured to be writable and readable by said first CPU and said second CPU via said first FIFO and said second FIFO, respectively;
   a first individual storage medium and a second individual storage medium;
   a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;
   a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively,
   wherein data corresponding to different addresses of said first individual storage medium are simultaneously readable by said first CPU and said second CPU.

2. A memory device accessible by a first CPU and a second CPU, comprising:
   a first FIFO corresponding to said first CPU;
   a second FIFO corresponding to said second CPU;
   a shared storage medium configured to be writable and readable by said first CPU and said second CPU via said first FIFO and said second FIFO, respectively;
   a first individual storage medium and a second individual storage medium;
   a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;
   a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively, wherein
   said shared storage medium includes an area writable exclusively by said first CPU, and
   said first individual storage medium is written with information indicating said area by said first CPU,
   said memory device further comprising
   a shared storage medium controller configured to prohibit writing from said first CPU to said shared storage medium, except for said area.

3. A memory device accessible by a first CPU and a second CPU, comprising:
   a first FIFO corresponding to said first CPU;
   a second FIFO corresponding to said second CPU;
   a shared storage medium configured to be writable and readable by said first CPU and said second CPU via said first FIFO and said second FIFO, respectively;
   a first individual storage medium and a second individual storage medium;
   a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;
   a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively, wherein
   said shared storage medium includes an area writable exclusively by said second CPU, and
   said first individual storage medium is written with information indicating said area by said first CPU,
   said memory device further comprising
   a shared storage medium controller configured to prohibit writing from said second CPU to said shared storage medium, except for said area.

4. The memory device according to claim 1, wherein
   said shared storage medium includes an area writable exclusively by said first CPU, and
   said first individual storage medium is written with information indicating said area by said first CPU,
   said memory device further comprising
   a shared storage medium controller configured to prohibit writing from said first CPU to said shared storage medium, except for said area.

5. The memory device according to claim 1, wherein
   said shared storage medium includes an area writable exclusively by said second CPU, and
   said first individual storage medium is written with information indicating said area by said first CPU,
   said memory device further comprising
   a shared storage medium controller configured to prohibit writing from said second CPU to said shared storage medium, except for said area.

6. A memory device accessible by a first CPU and a second CPU, comprising:
   a first FIFO corresponding to said first CPU;
   a second FIFO corresponding to said second CPU;
   a shared storage medium configured to be writable and readable by said first CPU and said second CPU via said first FIFO and said second FIFO, respectively;
   a first individual storage medium and a second individual storage medium;

a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;

a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively;

a first parallel interface (I/F) and a first serial I/F provided in a corresponding manner to said first CPU, said first parallel I/F and said first serial I/F being capable of communicating with said first CPU;

a second parallel I/F and a second serial I/F provided in a corresponding manner to said second CPU., said second parallel I/F and said second serial I/F being capable of communicating with said second CPU;

a first selection section provided in a corresponding manner to said first CPU, said first selection section being configured to connect selectively said first parallel I/F and said first serial I/F to said first FIFO; and a second selection section provided in a corresponding manner to said second CPU, said second selection section being configured to connect selectively said second parallel I/F and said second serial I/F to said second FIFO.

7. The memory device according to claim 1, further comprising:
a first parallel I/F and a first serial I/F provided in a corresponding manner to said first CPU, said first parallel I/F and said first serial I/F being capable of communicating with said first CPU;
a second parallel I/F and a second serial I/F provided in a corresponding manner to said second CPU, said second parallel I/F and said second serial I/F being capable of communicating with said second CPU;
a first selection section provided in a corresponding manner to said first CPU, said first selection section being configured to connect selectively said first parallel I/F and said first serial I/F to said first FIFO; and
a second selection section provided in a corresponding manner to said second CPU, said second selection section being configured to connect selectively said second parallel I/F and said second serial I/F to said second FIFO.

8. The memory device according to claim 6, wherein
said first selection section is based on a selection signal defined by an external signal, and
said second selection section is based on a signal stored in said first individual storage medium.

9. The memory device according to claim 7, wherein
said first selection section is based on a selection signal defined by an external signal, and
said second selection section is based on a signal stored in said first individual storage medium.

10. A memory device accessible by a first CPU and a second CPU, comprising:
a first FIFO corresponding to said first CPU;
a second FIFO corresponding to said second CPU;
a shared storage medium configured to be writable and readable by said first CPU and said second CPU via said first FIFO and said second FIFO, respectively;
a first individual storage medium and a second individual storage medium;
a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;
a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively,
wherein said first individual storage medium is written with an interrupt request from said first CPU to said second CPU,
said memory device further comprising
an interrupt processing section configured to output an interrupt signal to said second CPU with said interrupt request as a trigger.

11. The memory device according to claim 1, wherein said first individual storage medium is written with an interrupt request from said first CPU to said second CPU,
said memory device further comprising
an interrupt processing section configured to output an interrupt signal to said second CPU with said interrupt request as a trigger.

12. The memory device according to claim 10, wherein said interrupt processing section outputs said interrupt signal to said second CPU with one of a level or an edge of said interrupt request selectively as a trigger.

13. The memory device according to claim 11, wherein said interrupt processing section outputs said interrupt signal to said second CPU with one of a level or an edge of said interrupt request selectively as a trigger.

14. A memory device accessible by a first CPU and a second CPU, comprising:
a first FIFO corresponding to said first CPU;
a second FIFO corresponding to said second CPU;
a shared storage medium configured to be writable and readable by said first CPU and said second CPU via said first FIFO and said second FIFO, respectively;
a first individual storage medium and a second individual storage medium;
a first register controller provided between said first individual storage medium and said first FIFO and configured to exclusively write data from said first CPU to said first individual storage medium, said first individual storage medium being connected to said first FIFO and said second FIFO independently of the first register controller, said first medium being independently readable by said first CPU and said second CPU via said first FIFO and said second FIFO respectively;

a second register controller provided between said second individual storage medium and said second FIFO and configured to exclusively write data to said second individual storage medium from said second CPU, said second individual storage medium being connected to said first FIFO and said second FIFO independently of the second controller, said second individual storage medium being independently readable by said first CPU and said second CPU via said first FIFO and said second FIFO respectively, wherein said first individual storage medium is written with depth information on said first FIFO, said memory device further comprising a FIFO depth changing section configured to change a depth of said first FIFO based on said depth information.

15. The memory device according to claim 1, wherein said first individual storage medium is written with depth information on said first FIFO, said memory device further comprising a FIFO depth changing section configured to change a depth of said first FIFO based on said depth information.

* * * * *